United States Patent
Narayanan et al.

(10) Patent No.: US 12,321,280 B2
(45) Date of Patent: Jun. 3, 2025

(54) SYSTEMS AND METHODS FOR MANAGING A MACHINE LEARNING DISTRIBUTED CACHE

(71) Applicant: Verizon Patent and Licensing Inc., Basking Ridge, NJ (US)

(72) Inventors: Gopala Krishnan Sankara Narayanan, Chennai (IN); Navin Dalavai Premkumar, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 199 days.

(21) Appl. No.: 18/153,785

(22) Filed: Jan. 12, 2023

(65) Prior Publication Data
US 2024/0241833 A1    Jul. 18, 2024

(51) Int. Cl.
| | | |
|---|---|---|
| *G06F 12/08* | (2016.01) | |
| *G06F 12/0817* | (2016.01) | |
| *G06F 12/0891* | (2016.01) | |
| *G06F 12/12* | (2016.01) | |
| *G06F 12/123* | (2016.01) | |

(52) U.S. Cl.
CPC ...... *G06F 12/0891* (2013.01); *G06F 12/0824* (2013.01); *G06F 12/123* (2013.01)

(58) Field of Classification Search
CPC .. G06F 12/08; G06F 12/0824; G06F 12/0891; G06F 12/0817; G06F 12/123
See application file for complete search history.

(56) References Cited

U.S. PATENT DOCUMENTS

| | | | | |
|---|---|---|---|---|
| 2014/0129779 A1* | 5/2014 | Frachtenberg | ........ | G06F 12/123 |
| | | | | 711/136 |
| 2014/0368524 A1* | 12/2014 | Srinivasan | .......... | G06F 12/0802 |
| | | | | 345/557 |
| 2018/0349292 A1* | 12/2018 | Tal | ......................... | G06F 12/123 |
| 2020/0167281 A1* | 5/2020 | Flores | .................... | H04L 67/06 |
| 2021/0117808 A1* | 4/2021 | Gottin | ..................... | G06N 5/04 |
| 2021/0149805 A1* | 5/2021 | Pinho | .................. | G06F 12/0862 |
| 2021/0203515 A1* | 7/2021 | Deng | ..................... | G06N 3/049 |
| 2021/0286730 A1* | 9/2021 | Lv | .......................... | G06F 12/127 |
| 2021/0374523 A1* | 12/2021 | Gottin | .................... | G06N 3/088 |
| 2022/0261357 A1* | 8/2022 | Gabbai | ................. | G06F 12/126 |

(Continued)

OTHER PUBLICATIONS

Q. Fan, X. Li, J. Li, Q. He, K. Wang and J. Wen, "PA-Cache: Evolving Learning-Based Popularity—Aware Content Caching in Edge Networks," in IEEE Transactions on Network and Service Management, vol. 18, No. 2, pp. 1746-1757, Jun. 2021.*

(Continued)

*Primary Examiner* — Pierre Michel Bataille (57) ABSTRACT

A device may include a processor configured to obtain a plurality of values for one or more cache population parameters associated with a distributed cache for a machine learning system. The processor may be further configured to provide the obtained plurality of values as inputs into a machine learning model trained to select a cache policy for the distributed cache; receive the selected cache policy from the machine learning model, wherein the selected cache policy includes a cache eviction policy that includes an eviction rule indicating when to remove particular data items from the distributed cache; and apply the received cache policy to the distributed cache.

20 Claims, 7 Drawing Sheets

(56) References Cited

U.S. PATENT DOCUMENTS

2024/0211399 A1\* 6/2024 Punniyamurthy .. G06F 12/0813
2024/0211814 A1\* 6/2024 Mohan ................... G06N 20/20

OTHER PUBLICATIONS

X. Qin, W. Zhang, W. Wang, J. Wei, H. Zhong and T. Huang, "On-line Cache Strategy Reconfiguration for Elastic Caching Platform: A Machine Learning Approach," 2011 IEEE 35th Annual Computer Software and Applications Conference, Munich, Germany, 2011, pp. 523-534.\*

W. Ma, Y. Zhu, S. Wang and Y. Bao, "LearnedCache: A Locality-Aware Collaborative Data Caching by Learning Model," 2019 IEEE Intl Conf on Parallel & Distributed Processing with Applications, Big Data & Cloud Computing, Sustainable Computing & Communications, Social Computing & Networking.\*

\* cited by examiner

SYSTEMS AND METHODS FOR MANAGING A MACHINE LEARNING DISTRIBUTED CACHE

BACKGROUND INFORMATION

To satisfy the needs and demands of users of mobile communication devices, providers of wireless communication services continue to improve and expand available services and networks used to deliver such services. Such improvements include the development of machine learning systems to generate predictions that improve customer experience. A machine learning system may use a cache from which to receive input data. The data cache may grow to a large size. Managing a large data cache for a machine learning system may pose various difficulties.

DETAILED DESCRIPTION OF EXAMPLE EMBODIMENTS

The following detailed description refers to the accompanying drawings. The same reference numbers in different drawings identify the same or similar elements.

A provider of wireless communication services may design, develop, and/or train a machine learning system to improve the functioning of a network, a service, a device, and/or another aspect of communication services. As an example, a machine learning system may be trained to classify customer service tickets in order to direct the customer service tickets to an appropriate customer service expert. As another example, a machine learning system may be trained to generate a recommendation, for a product or service, to a user based on attributes associated with the user. The machine learning system may use a distributed cache for input data that is to be used to train the machine learning system and/or that is to be used to generate predictions and/or classifications by the machine learning system.

A "distributed cache," as the term is used herein, refers to a memory component, associated with one or more computer devices, which stores data items so that future requests for the data can be fulfilled at a lower latency and higher throughput than other memory components, and which is distributed across multiple devices (e.g., servers, etc.) and scalable. A distributed cache may store a large number of data items to be used to train a machine learning system and/or to be processed by the machine learning system for generating predictions and/or classifications. Managing the distributed cache may require various decisions to be made. As an example, the distributed cache may fill up with data items and decisions may need to be made regarding which older data items are to be removed. As another example, a decision may need to be made as to whether to adjust the size of the distributed cache.

Implementations described herein relate to systems and methods for managing a distributed cache used by a machine learning system. A trained machine leaning model may select a cache policy for the distributed cache based on values for one or more cache population parameters associated with the distributed cache. For example, a device may be configured to obtain a set of values for one or more cache population parameters associated with a distributed cache for a machine learning system; provide the obtained set of values as inputs into a machine learning model trained to select a cache policy for the distributed cache; receive the selected cache policy from the machine learning model; and apply the received cache policy to the distributed cache.

The cache population parameters may include a hit and miss ratio parameter that measures a ratio of a number of successfully fulfilled requests from the machine learning system to the distributed cache over a time period to a number of unfulfilled cache requests from the machine learning system to the distributed cache over the time period; a data retention parameter that measures how long a data item is retained in the distributed cache; a data distribution parameter that measures whether particular data items are distributed in the distributed cache; and/or other types of cache population parameters.

The cache policy may include a cache eviction policy that includes an eviction rule for data items in the distributed cache, indicating when to remove particular data items from the distributed cache. The cache eviction policy may include an eviction rule based on how recently or frequently a data item has been used, such as, for example, a least recently used (LRU) eviction rule, a least frequently used (LFU) eviction rule, a random recently used (RRU) eviction rule, a random frequently used (RFU) eviction rule, and/or another type of eviction rule. Additionally, or alternatively, the cache eviction policy includes an eviction policy for a particular attribute included in data items stored in the distributed cache.

Furthermore, the cache policy may include a cache tuning policy. The cache tuning policy may include a policy to adjust a size of the distributed cache, a policy to shard (e.g., partition into multiple instances, etc.) a node of the distributed cache, and/or another type of cache tuning policy. For example, a policy to shard a node may include a policy to shard the node based on an attribute associated with data items stored in the node.

Figure 1:
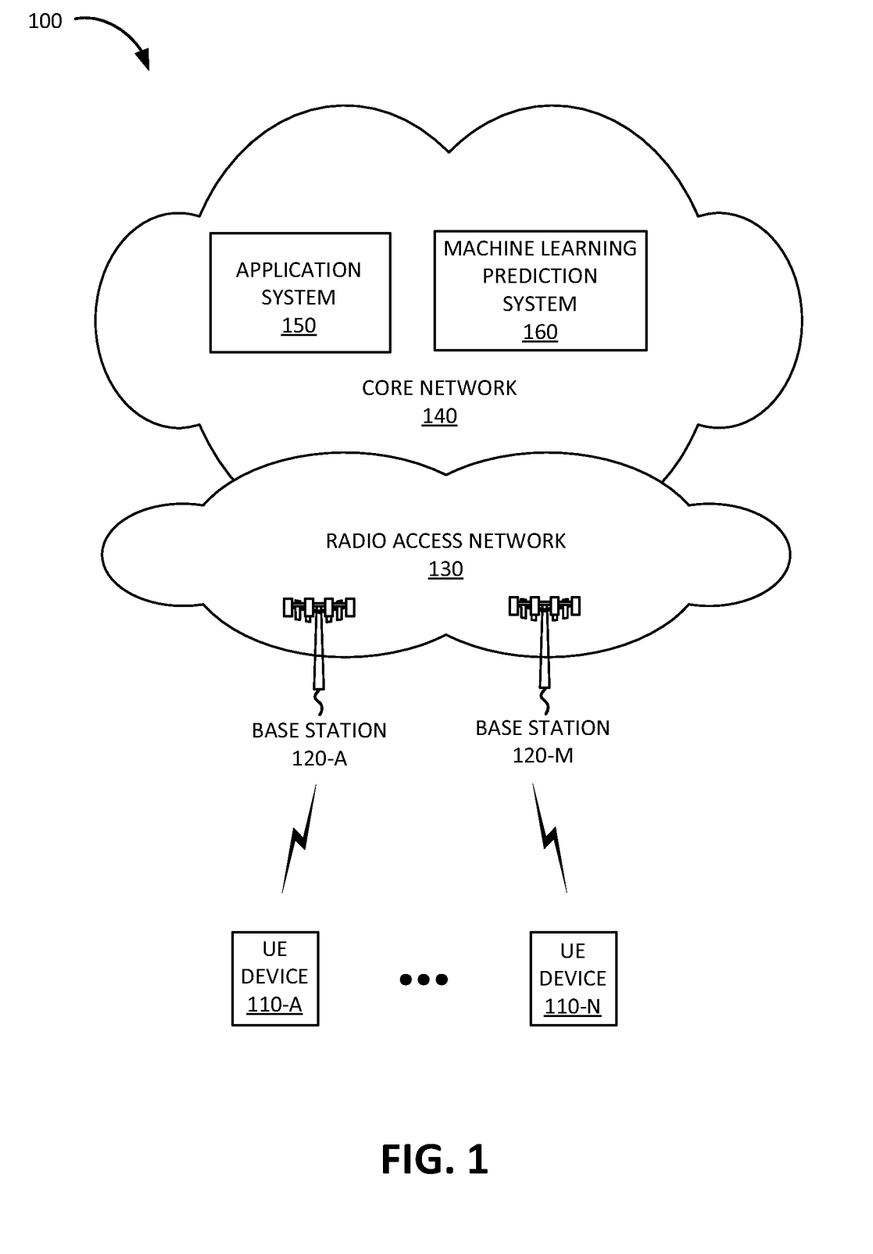
FIG. 1 illustrates an environment according to an implementation described herein.

FIG. 1 is a diagram of an exemplary environment 100 in which the systems and/or methods described herein may be implemented. As shown in FIG. 1, environment 100 may include UE devices 110-A to 110-N (referred to herein collectively as "UE devices 110" and individually as "UE device 110"), Radio Access Network (RAN) 130 that includes base stations 120-A to 120-M (referred to herein collectively as "base stations 120" and individually as "base station 120"), and core network 140 that includes an application system 150 and a machine learning (ML) prediction system 160.

UE device 110 may include any device with cellular wireless communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; and/or any other type of computer device with wireless communication capabilities and a user interface. In some implementations, UE device 110 may communicate using machine-to-machine (M2M) communication, such as Machine Type Communication (MTC), and/or another type of M2M communication for Internet of Things (IoT) applications. UE device 110 may include capabilities for voice communication, mobile broadband services (e.g., video streaming, real-time gaming, premium Internet access etc.), best effort data traffic, and/or other types of applications.

RAN 130 may include base stations 120. Base station 120 may be configured for one or more Radio Access Technology (RAT) types. For example, base station 120 may include a 5G New Radio (NR) base station (e.g., a gNodeB) and/or a Fourth Generation (4G) Long Term Evolution (LTE) base station (e.g., an eNodeB). Base station 120 may include a radio frequency (RF) transceiver configured to communicate with UE devices 110 using a 5G NR air interface, a 4G LTE air interface, and/or using another type of cellular air interface.

Core network 140 may be managed by a provider of cellular wireless communication services and may manage communication sessions of subscribers connecting to core network 140 via RAN 130. For example, core network 140 may establish an Internet Protocol (IP) connection between UE devices 110 and a packet data network (not shown in FIG. 1). The components of core network 140 may be implemented as dedicated hardware components or as virtualized functions implemented on top of a common shared physical infrastructure using software defined networking (SDN). For example, an SDN controller may implement one or more of the components of core network 140 using an adapter implementing a virtual network function (VNF) virtual machine, a Cloud Native Function (CNF) container, an event driven serverless architecture interface, and/or another type of SDN component. The common shared physical infrastructure may be implemented using one or more devices 200 described below with reference to FIG. 2 in a cloud computing center associated with core network 140. Additionally, or alternatively, some, or all, of the shared physical infrastructure may be implemented using one or more devices 200 implemented in a Multi-Access Edge Computing (MEC) network (not shown in FIG. 1) associated with RAN 130 and/or core network 140.

Application system 150 may include one or more computer devices, such as server devices which implement an application that uses ML prediction system 160 to generate predictions and/or classifications for products and/or services associated with customers of RAN 130 and/or core network 140, for improving the operation of RAN 130 and/or core network 140, and/or other types of predictions and/or classifications. As an example, application system 150 may process service tickets and direct customer tickets to appropriate customer service experts. As another example, application system 150 may include a recommendation system that provides recommendations for products and/or services for customers of the provider that manages RAN 130 and/or core network 140. As yet another example, application system 150 may include a network management system that manages network devices and/or network connections in RAN 130 and/or core network 140 and generates maintenance, repair, and/or upgrade service tickets for RAN 130 and/or core network 140. Application system 150 may generate data and send the data as input to ML prediction system 160 to provide a prediction and/or classification based on the received input. While FIG. 1 shows a single application system 150 for illustrative purposes, in practice, environment 100 may include multiple and different types of application systems 150 that use ML prediction system 160.

ML prediction system 160 may include one or more computer devices, such as server devices, which generate and provide a prediction and/or classification to application system 150 based on input data received from application system 150. ML prediction system 160 may include an ML system that uses a distributed cache to train the ML system. Furthermore, the distributed cache may include data for which the ML system is to generate predictions and/or classifications. ML prediction system 160 may include an ML model to manage the distributed cache. The ML model may use cache population metrics to select cache policies for the distributed cache.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
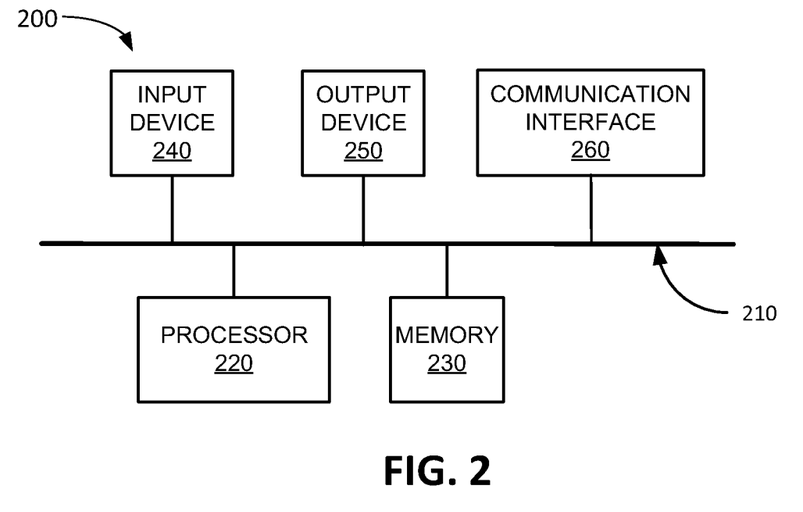
FIG. 2 illustrates exemplary components of a device that may be included in a component of an environment according to an implementation described herein.

FIG. 2 illustrates example components of a device 200 according to an implementation described herein. UE device 110, base station 120, application system 150, and/or machine learning prediction system 160 may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., RF, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to RF signals and/or a receiver that converts RF signals to baseband signals. Communication interface 260 may be coupled to one or more antennas/antenna arrays for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, in an implementation, device 200 may perform certain operations relating to selecting and applying a cache policy to a machine learning distributed cache. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally, or alternatively, one or more components of device 200 may perform one or more tasks described as being performed by one or more other components of device 200.

Figure 3:
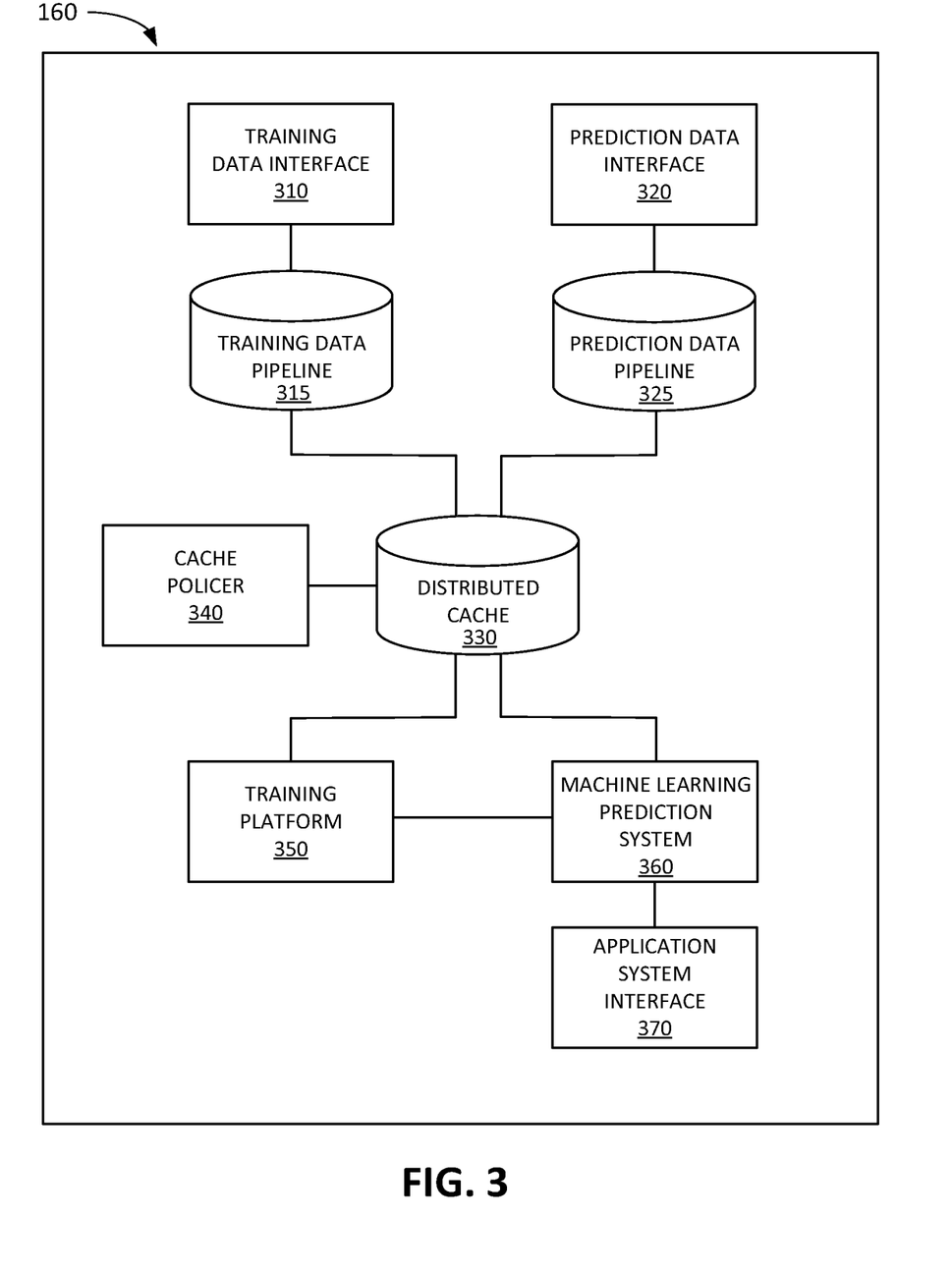
FIG. 3 illustrates exemplary components of a machine learning prediction system according to an implementation described herein.

FIG. 3 is a diagram illustrating exemplary components of machine learning prediction system 160. The components of machine learning prediction system 160 may be implemented, for example, via processor 220 executing instructions from memory 230. Alternatively, some or all of the components of machine learning prediction system 160 may be implemented via hard-wired circuitry. As shown in FIG. 3, machine learning prediction system 160 may include a training data interface 310, a training data pipeline 315, a prediction data interface 320, a prediction data pipeline 325, a distributed cache 330, a cache policer 340, a training platform 350, a machine learning prediction system 360, and an application system interface 370.

Training data interface 310 may interface with a source of training data associated with application system 150. For example, the training data may include historical data associated with application system 150, training data manually labeled by a domain expert, past predictions generated by machine learning prediction system 360, and/or other sources of training data. Training data pipeline 315 may prepare training data for ingestion into distributed cache 330. For example, training data pipeline 315 may modify the training data into a format used by machine learning prediction system 360, by, for example, generating feature vectors based on training data items, with elements of the feature vectors storing values corresponding to different features.

Prediction data interface 320 may interface with a source of data to be used in generating predictions and/or classifications. For example, prediction data interface 320 may receive data items for which a prediction and/or classification is to be generated by machine learning prediction system 360. The data items may be received from application system 150, from UE devices 110 communicating with application system 150, and/or from another source. Prediction data pipeline 325 may prepare prediction data for ingestion into distributed cache 330. For example, prediction data pipeline 325 may modify the prediction data into a format used by machine learning prediction system 360, by, for example, generating feature vectors based on the prediction data items, with elements of the feature vectors storing values corresponding to different features.

Distributed cache 330 may store training data and/or prediction data to be processed by machine learning prediction system 360. Distributed cache 330 may pool memory space of multiple networked nodes into a single memory store used as a data cache by machine learning prediction system 360. Each node may be implemented on a different physical or virtual computer device and a set of nodes may be grouped together into a cluster. Distributed cache 330 may include one or more clusters. Distributed cache 330 may be scalable to increase or decrease the number of nodes, the number of clusters, the size of a node (e.g., the memory storage capacity of a node, etc.), and/or other aspects of distributed cache 330. Data items, such as input vectors into machine learning prediction system 360, may be stored in a single node or distributed across multiple nodes. A cache policy may determine whether data items, or particular types of data items, are distributed in distributed cache 330.

Cache policer 340 may use a trained machine learning model to select a cache policy for distributed cache 330 based on one or more cache population parameters associated with distributed cache 340. Exemplary components of cache policer 340 are described below with reference to FIG. 4.

Training platform 350 may be used to train and/or update machine learning prediction system 360. For example, training platform 350 may ingest training data from distributed cache 330 and use the ingested training data to train or update machine learning prediction system 360 to generate predictions and/or classifications for application system 150 (e.g., to classify customer tickets; to provide recommendations for products and/or services for customers of the provider that manages RAN 130 and/or core network 140; to provide recommendations regarding the management of network devices and/or network connections in RAN 130 and/or core network 140; to classify maintenance, repair, and/or upgrade service tickets for RAN 130 and/or core network 140; etc.). Machine learning prediction system 360 may include one or more machine learning models trained to generate predictions and/or classifications for application system 150 based on data in distributed cache 330. Machine learning prediction system 360 may include, for example, a deep learning neural network and/or another type of neural network, and/or another type of machine learning model, such as, for example, a Support Vector Machine (SVM) classifier, a K-nearest neighbors (KNN) classifier, a naïve Bayesian classifier, a random forest classifier, a logistic regression classifier, a linear discriminant analysis classifier, a quadratic linear discriminant analysis classifier, a maximum entropy classifier, a kernel density estimation classifier, a principal component analysis (PCA) classifier, etc.

Application system interface 370 may be configure to communicate with application system 150. For example, application system interface 370 may receive requests from application system 150 to generate a prediction and/or classification for a particular data item, may obtain a prediction and/or classification for the particular data item from machine learning prediction system 360, if machine learning prediction system 360 is able to retrieve the particular data item from distributed cache 330, and provide the obtained prediction and/or classification to application system 150. If machine learning prediction system 360 is not able to retrieve the particular data item from distributed cache 330, application system interface 370 may return an error message.

Although FIG. 3 shows exemplary components of machine learning prediction system 160, in other implementations, machine learning prediction system 160 may include fewer components, different components, additional components, or differently arranged components than depicted in FIG. 3. Additionally, or alternatively, one or more components of machine learning prediction system 160 may perform one or more tasks described as being performed by one or more other components of machine learning prediction system 160.

Figure 4:
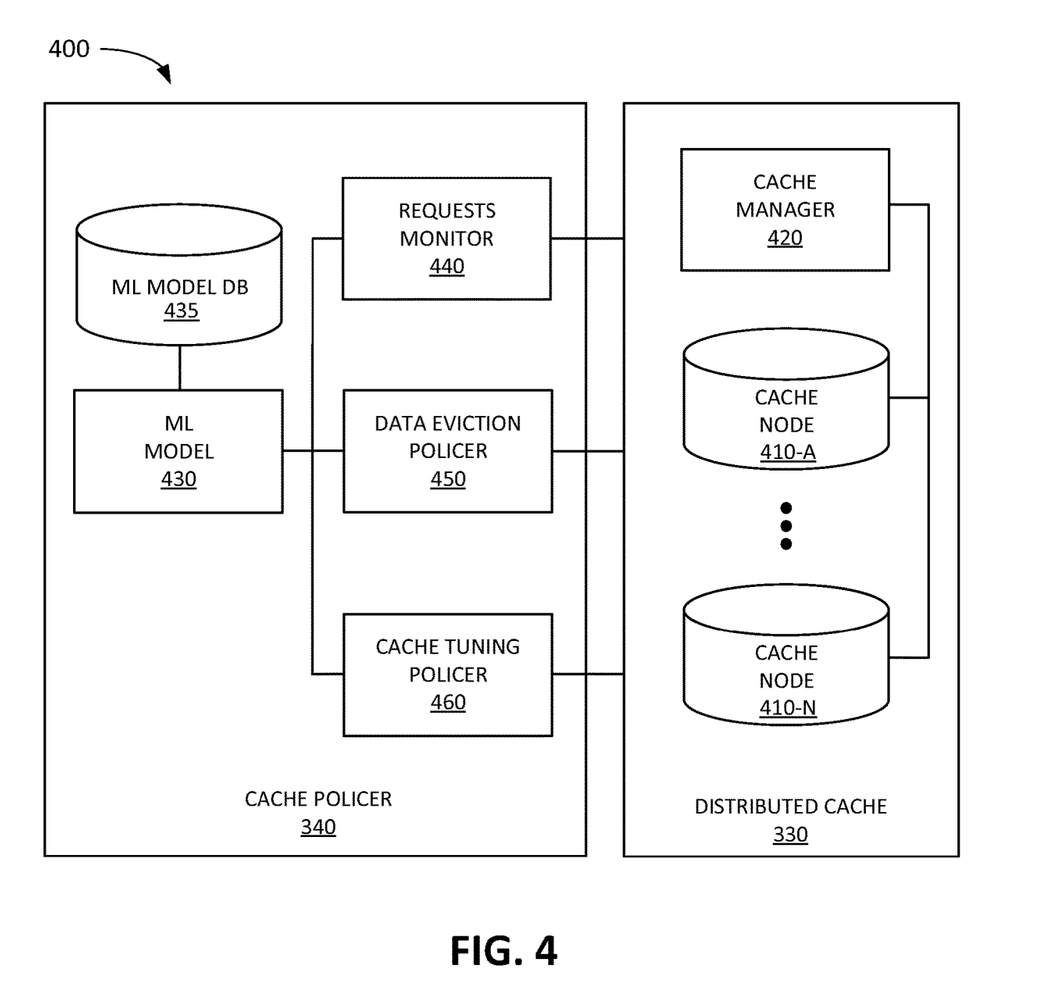
FIG. 4 illustrates exemplary components of a cache policer and a distributed cache according to an implementation described herein.

FIG. 4 illustrates exemplary components of a subsystem 400 of machine learning prediction system 160. Subsystem 400 includes cache policer 340 and distributed cache 330. As shown in FIG. 4, distributed cache 330 may include cache nodes 410-A to 410-N (referred to collectively as "cache nodes 410" and individually as "cache node 410") and a cache manager 420.

Each cache node 410 may be implemented on a different physical or virtual computer device and a set of nodes may be grouped together into a cluster. Data stored in cache node 410 may be distributed to other cache nodes 410 if data distribution is enabled or selected for cache node 410. Cache manager 420 may manage cache nodes 410. For example, cache manager 420 may configure cache nodes 410 based on a cache policy received from cache policer 340. Cache manager 420 may use the cache policy to apply an eviction rule to cache node 410, to shard cache node 410 into multiple cache nodes 410, to add a new cache node 410, increase or decrease the memory storage capacity of cache node 410, configure multiple cache nodes 410 to distribute data to each other, designate cache node 410 to store data items of a particular type, designate cache node 410 to store training data only or to store prediction data only, and/or otherwise manage cache nodes 410.

Cache policer 340 may include an ML model 430, an ML model DB 435, requests monitor 440, a data eviction policer 450, and a cache tuning policer 460. ML model 430 may include a machine learning model trained to select a cache policy based on values for one or more cache population metrics associated with distributed cache 330. ML model 430 may store information associated with cache policy selections in ML model DB 435. Exemplary information that may be stored in ML mode DB 435 is described below with reference to FIG. 5.

In some implementations, ML model 430 may include a deep learning neural network. In other implementations, ML model 430 may include a different type of neural network, or a different type of machine learning model, such as, for example, an SVM classifier, a KNN classifier, a naïve Bayesian classifier, a random forest classifier, a logistic regression classifier, a linear discriminant analysis classifier, a quadratic linear discriminant analysis classifier, a maximum entropy classifier, a kernel density estimation classifier, a PCA classifier, etc.

ML model 430 may be trained using training data associated with distributed cache 330. The source of training data may include cache population metric values and associated manually selected cache policies for the cache population metric values, selected by a domain expert; historical cache population metric values associated with distributed cache 330 along with manually selected cache policies based on the historical cache population metric values; historical cache population metric values associated with distributed cache 330 along with cache policies selected by a previously trained version of ML model 430 based on the historical cache population metric values; and/or sources of training data. Furthermore, the training of ML model 430 may be periodically updated.

In some implementations, training and/or updating of ML model 430 may be performed using reinforcement learning (RL). For example, data eviction policer 450 and/or cache tuning policer 460 may set a reward function for selecting a cache policy and may instruct ML model 430 to maximize the reward function during training. The reward function may be based on a target hit and miss ratio, a target available capacity of distributed cache 330, a target latency of distributed cache 330, any combination thereof, and/or another type of reward function.

Requests monitor 440 may monitor requests to distributed cache 330 from machine learning prediction system 360 and calculate a hit and miss ratio for distributed cache 330 during a particular time period. Requests monitor 440 may calculate a total hit and miss ratio for all requests received by distributed cache 330. Additionally, or alternatively, requests monitor 440 may calculate a hit and miss ratio for a particular data type, such as a hit and miss ratio for training data, a hit and miss ratio for prediction data, a hit and miss ratio for data items associated with a particular data attribute, and/or other types of hit and miss ratios. Requests monitor 440 may provide the calculated hit and miss ratios to ML model DB 435.

Data eviction policer 450 may monitor data retention/eviction data for distributed cache 330, such as, for example, retention data that measures how long data items are retained in distributed cache 330, retention data that measures how long data items associated with particular data attributes are retained in the distributed cache, etc. Data eviction policer 450 may provide the determined retention data to ML model 430. Furthermore, data eviction policer 450 may receive a cache eviction policy prediction from ML model 430, select a cache eviction policy based on the cache eviction policy prediction, and apply the selected cache eviction policy to distributed cache 330. The cache policy may include an eviction rule (e.g., an LRU eviction rule, an LFU eviction rule, an RRU eviction rule, an RFU eviction rule, etc.) to be used for all data items in distributed cache 330. Additionally, or alternatively, the eviction rule may include a custom cache eviction rule applied to data items associated with a particular attribute, such as training data items, prediction data items, data items that include a particular data field, data items that include a particular value in a particular data field, etc.

Cache tuning policer 460 may monitor distribution data for distributed cache 330, such as, for example, distribution data that measures whether data items are distributed in distributed cache 330, whether data items associated with particular data attributes are distributed, whether data items stored in a particular cache node 410 are distributed, whether data items associated with particular data attributes stored in a particular cache node 410 are distributed, etc. Cache tuning policer 460 may provide the determined distribution data to ML model 430. Furthermore, cache tuning policer 460 may receive a cache tuning policy from ML model 430, select a cache tuning policy based on the cache eviction policy, and apply the selected cache tuning policy to distributed cache 330. The cache tuning policy may include a policy to increase the number of nodes in distributed cache 340, to increase the size of nodes or to increase the size of a particular node in distributed cache 340, to shard nodes in distributed cache 340, to shard a particular node or a particular type of node in distributed cache 340, and/or another type of cache tuning policy.

Although FIG. 4 shows exemplary components of subsystem 400, in other implementations, subsystem 400 may include fewer components, different components, additional components, or differently arranged components than depicted in FIG. 4. Additionally, or alternatively, one or more components of subsystem 400 may perform one or more tasks described as being performed by one or more other components of subsystem 400.

Figure 5:
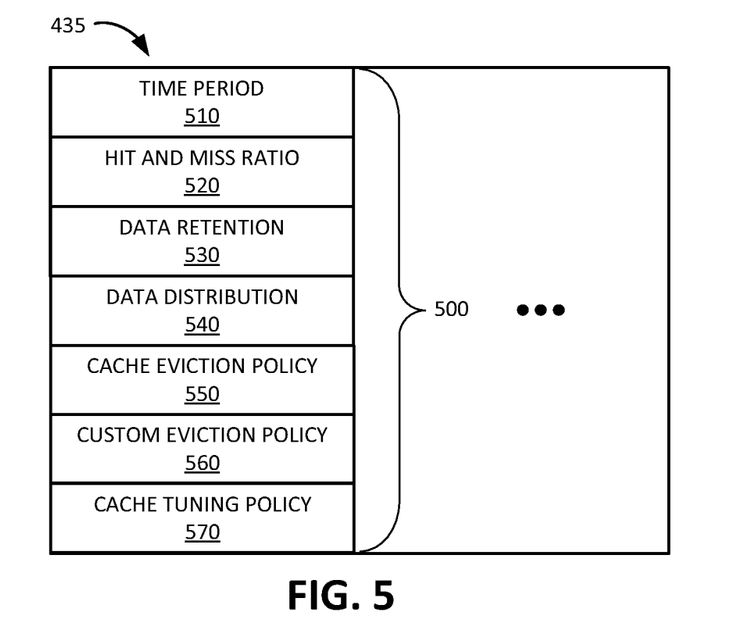
FIG. 5 illustrates exemplary components of a machine learning model database according to an implementation described herein.

FIG. 5 illustrates exemplary components of machine learning model DB 435 according to an implementation described herein. As shown in FIG. 5, machine learning model DB 435 may include one or more time period records 500. Each time period record 500 may store information relating to a particular time period associated with distributed cache 330. Time period record 500 may include a time period field 510, a hit and miss ratio field 520, a data retention field 530, a data distribution field 540, a cache eviction policy field 550, a custom eviction policy field 560, and a cache tuning policy 570.

Time period field 510 may include information identifying a particular time period associated with a selection made by ML model 430. Hit and miss ratio field 520 may store a hit and miss ratio value that measures a number of successfully fulfilled requests from ML prediction system 360 to distributed cache 330 during the particular time period to a number of unfulfilled requests from ML prediction system 360 to distributed cache 330 during the particular time period. Additionally, or alternatively, different types of data items may be associated with different hit and miss ratios. For example, hit and miss ratio field 520 may store one or more hit and miss ratio values for data items associated with particular data attributes (e.g., a hit and miss ration for data items that include a location attribute, a hit and miss ratio for data items associated with a value or a set of values in the location attribute, etc.).

Data retention field 530 may store a data retention value that measures how long data items are retained in distributed cache 330 during the particular time period. Additionally, or alternatively, different types of data items may be associated with different data retention values. For example, data retention field 530 may store different data retention values for data items associated with different data attributes.

Data distribution field 540 may store a data distribution value that identifies whether data items are distributed in the distributed cache during the particular time period. Additionally, or alternatively, different types of data items may be associated with different data distribution statuses. For example, data distribution field 540 may store different data retention statuses for data items associated with different data attributes.

Cache eviction policy field 550 may store information identifying a cache eviction policy selected for distributed cache 340 by ML model 340 for the particular time period. For example, cache eviction policy field 550 may identify the cache eviction policy as using an LRU eviction rule, an LFU eviction rule, an RRU eviction rule, an RFU eviction rule, and/or another type of eviction rule. As other examples, the cache eviction policy may include a not frequently used (NFU) eviction rule, an adaptive replacement cache (ARC) eviction rule, a low inter-reference recency set (LIRS) eviction rule, and/or another type of eviction rule.

Custom eviction policy field 560 may store information identifying one or more custom eviction policies selected for distributed cache 340 by ML model 340 for the particular time period. For example, custom eviction policy field 560 may identify an eviction policy for particular types of data items, such as data items associated with a particular attribute, data items associated with a particular value, or set of values, for the particular attribute, training data items, prediction data items, data items associated with a particular user or a particular type of user, data items associated with a particular application system 150, data items associated with a particular cache node 410, and/or another type of custom eviction policy.

Cache tuning policy 570 may store information identifying a cache tuning policy selected for distributed cache 340 by ML model 340 for the particular time period. For example, cache tuning policy field 50 may identify a cache tuning policy to increase the number of nodes in distributed cache 340, to increase the size of nodes or to increase the size of a particular node in distributed cache 340, to shard nodes in distributed cache 340, to shard a particular node or a particular type of node in distributed cache 340, and/or another type of cache tuning policy.

Although FIG. 5 shows exemplary components of machine learning model DB 435, in other implementations, machine learning model DB 435 may include fewer components, different components, additional components, or differently arranged components than depicted in FIG. 5.

Figure 6:
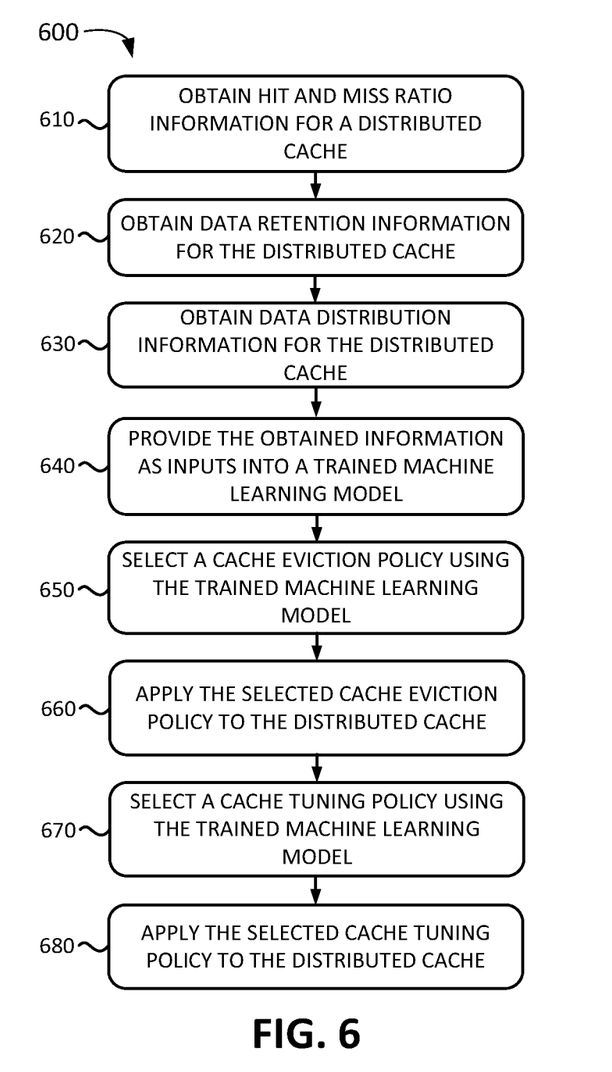
FIG. 6 is a flowchart of a process for selecting a cache policy for a distributed cache according to an implementation described herein.

FIG. 6 is a flowchart of a process for selecting a cache policy for a distributed cache according to an implementation described herein. In some implementations, process 600 of FIG. 6 may be performed by machine learning prediction system 160. In other implementations, some or all of process 700 may be performed by another device or a group of devices.

As shown in FIG. 6, process 600 may include obtaining a hit and miss ratio information for a distributed cache (block 610), obtaining data retention information for the distributed cache (block 620), obtaining data distribution information for the distributed cache (block 630), and providing the obtained information as inputs into a trained machine learning model (block 640). For example, cache policer 340 may collect values for a hit and miss ratio cache population parameter for distributed cache 330, data retention cache population parameter for distributed cache 330, data distribution cache population parameter for distributed cache 330, and provide the collected values as inputs into ML model 430.

Process 600 may further include selecting a cache eviction policy using the trained machine learning model (block 650) and applying the selected cache eviction policy to the distributed cache (block 660). For example, cache policer 340 may receive a prediction for the best cache eviction policy for the inputted values from ML model 430 and select a cache eviction policy based on the prediction. The cache eviction policy may include an eviction rule, such as, for example, an LRU eviction rule, an LFU eviction rule, an RRU eviction rule, an RFU eviction rule, and/or another type of eviction rule. Additionally, or alternatively, the cache eviction policy may include a custom cache eviction rule applied to data items associated with a particular attribute, such as training data items, prediction data items, data items that include a particular data field, data items that include a particular value in a particular data field, etc.

Process 600 may further include selecting a cache tuning policy using the trained machine learning model (block 670) and applying the selected cache tuning policy to the distributed cache (block 680). For example, cache policer 340 may receive a prediction for the best cache tuning policy for the inputted values from ML model 430 and select a cache tuning policy based on the prediction. The cache tuning policy may include a policy to increase the number of nodes in distributed cache 340, to increase the size of nodes or to increase the size of a particular node in distributed cache 340, to shard nodes in distributed cache 340, to shard a particular node or a particular type of node in distributed cache 340, and/or another type of cache tuning policy.

Figure 7:
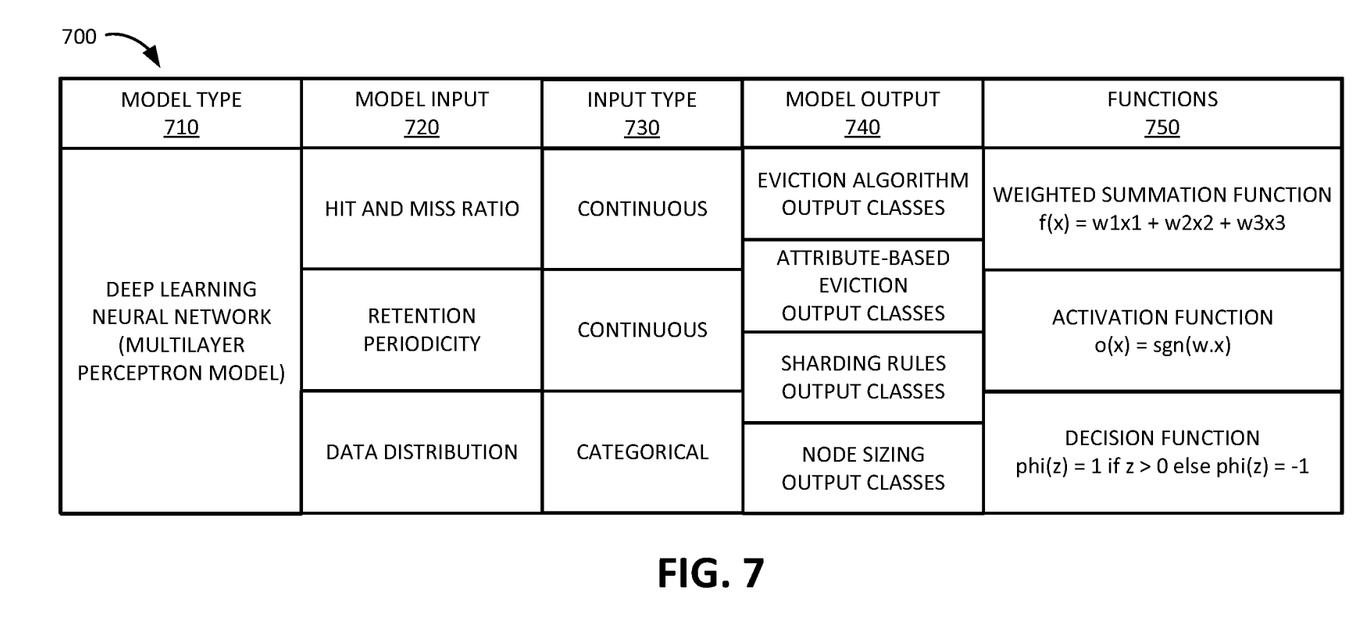
FIG. 7 illustrates parameters for an exemplary machine learning model according to an implementation described herein.

FIG. 7 illustrates a table 700 that includes parameters for ML model 430 according to an implementation described herein. As shown in FIG. 7, table 700 includes a model type column 710, a model input column 720, an input type column 730, a model output column 740, and a functions column 750.

Model type column 710 specifies that the type of neural network model corresponds to a deep learning neural network that includes a multilayer perceptron model. Each entry in model input column 720 specifies a particular input of the deep learning neural network and a corresponding entry in input type column 730 specifies an input type for the particular input. For example, a first input may include a hit and miss ratio input and correspond to a continuous input type (e.g., an integer or floating point type); a second input may include a retention periodicity input, indicating the number of hours a data item is retained in the distributed cache, and correspond to a continuous input type; and a third input may include a data distribution input indicating whether data is distributed across multiple nodes in the distributed cache and correspond to a categorical input type (e.g., a Boolean that indicate whether data distribution is true or false).

Each entry in model output column 740 specifies a particular output of the deep learning neural network. For example, a first set of outputs may include likelihood values for each of a set of eviction algorithm output classes, such as an LRU eviction algorithm, an LFU eviction algorithm, an RRU eviction algorithm, an RFU eviction algorithm, and/or another type of eviction algorithm. A second set of outputs may include likelihood values for each of a set of attribute-based eviction output classes. An attribute-based eviction rule may specify an eviction rule for data items associated with a particular data attribute. A third set of outputs may include likelihood values for each of a set of sharding rules output classes. Each sharding rule may specify whether to shard a particular node of distributed cache 330. A fourth set of outputs may include likelihood values for each of a set of node sizing rules output classes. Each node sizing rule may specify whether to increase the size of a particular node in distributed cache 330. Additionally, or alternatively, a node sizing rule may specify whether to increase the number of nodes in distributed cache 330.

Functions column 750 specifies functions used by the deep learning neural network. For example, the deep learning neural network may include a weighted summation function to add inputs into a node of the deep learning neural network. The deep learning neural network may include an activation function based on the sign (sgn) function to calculate whether activation of node output is triggered. Activation of a node may happen only when the learned weight factors pass a threshold for the node. Furthermore, the deep learning neural network may include a decision function for a collective decision from one layer of the deep learning neural network to the next layer.

While table 700 illustrates exemplary parameters of ML model 430, in other implementations, ML model 430 may include fewer parameters, different parameters, additional parameters, or differently arranged parameters than depicted in FIG. 7.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIG. 6, the order of the blocks may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
obtaining, by a device, a plurality of values for one or more cache population parameters associated with a distributed cache for a machine learning system;
providing, by the device, the obtained plurality of values as inputs into a machine learning model trained to select a cache policy for the distributed cache;
receiving, by the device, a cache eviction policy from the machine learning model, wherein the cache eviction policy includes an eviction rule indicating when to remove particular data items from the distributed cache;
applying, by the device, the received cache eviction policy to the distributed cache;
receiving, by the device, a cache tuning policy from the machine learning model, wherein the cache tuning policy includes a policy to adjust a size of the distributed cache or a policy to shard a node of the distributed cache; and
applying, by the device, the received cache tuning policy to the distributed cache.

2. The method of claim 1, wherein the one or more cache population parameters include a hit and miss ratio parameter that measures a ratio of a number of successfully fulfilled requests from the machine learning system to the distributed cache over a time period to a number of unfulfilled cache requests from the machine learning system to the distributed cache over the time period.

3. The method of claim 1, wherein the one or more cache population parameters include a data retention parameter that measures how long a data item is retained in the distributed cache.

4. The method of claim 1, wherein the one or more cache population parameters include a data distribution parameter that measures whether particular data items are distributed in the distributed cache.

5. The method of claim 1, wherein the cache eviction policy includes an eviction rule based on how recently or frequently a data item has been used.

6. The method of claim 5, wherein the cache eviction policy includes an eviction policy for a particular attribute included in data items stored in the distributed cache.

7. The method of claim 1, wherein the cache eviction policy includes at least one of:
a least recently used (LRU) eviction rule,
a least frequently used (LFU) eviction rule,
a random recently used (RRU) eviction rule, or
a random frequently used (RFU) eviction rule.

8. The method of claim 1, wherein the cache tuning policy includes the policy to adjust the size of the distributed cache.

9. The method of claim 1, wherein the cache tuning policy includes the policy to shard the node of the distributed cache.

10. The method of claim 9, wherein the policy to shard the node of the distributed cache includes a rule to shard the node based on an attribute associated with data items stored in the node.

11. A device comprising:
a processor configured to:
obtain a plurality of values for one or more cache population parameters associated with a distributed cache for a machine learning system;
provide the obtained plurality of values as inputs into a machine learning model trained to select a cache policy for the distributed cache;
receive a cache eviction policy from the machine learning model, wherein the cache eviction policy includes an eviction rule indicating when to remove particular data items from the distributed cache;
apply the received cache eviction policy to the distributed cache;
receive a cache tuning policy from the machine learning model, wherein the cache tuning policy includes a policy to adjust a size of the distributed cache or a policy to shard a node of the distributed cache; and
apply the received cache tuning policy to the distributed cache.

12. The device of claim 11, wherein the one or more cache population parameters include a hit and miss ratio parameter that measures a ratio of a number of successfully fulfilled requests from the machine learning system to the distributed cache over a time period to a number of unfulfilled cache requests from the machine learning system to the distributed cache over the time period.

13. The device of claim 11, wherein the one or more cache population parameters include a data retention parameter that measures how long a data item is retained in the distributed cache.

14. The device of claim 11, wherein the one or more cache population parameters include a data distribution parameter that measures whether particular data items are distributed in the distributed cache.

15. The device of claim 11, wherein the cache eviction policy includes an eviction rule based on how recently or frequently a data item has been used.

16. The device of claim 15, wherein the cache eviction policy includes at least one of:
- a least recently used (LRU) eviction rule,
- a least frequently used (LFU) eviction rule,
- a random recently used (RRU) eviction rule, or
- a random frequently used (RFU) eviction rule.

17. The device of claim 15, wherein the cache eviction policy includes an eviction policy for a particular attribute included in data items stored in the distributed cache.

18. The device of claim 11, wherein the cache tuning policy includes the policy to adjust the size of the distributed cache.

19. The device of claim 11, wherein the cache tuning policy includes the policy to shard the node of the distributed cache.

20. A non-transitory computer-readable memory device storing instructions executable by a processor, the non-transitory computer-readable memory device comprising:

one or more instructions to obtain a plurality of values for one or more cache population parameters associated with a distributed cache for a machine learning system;

one or more instructions to provide the obtained plurality of values as inputs into a machine learning model trained to select a cache policy for the distributed cache;

one or more instructions to receive a cache eviction policy from the machine learning model, wherein the cache eviction policy includes an eviction rule indicating when to remove particular data items from the distributed cache;

one or more instructions to apply the received cache eviction policy to the distributed cache;

one or more instructions to receive a cache tuning policy from the machine learning model, wherein the cache tuning policy includes a policy to adjust a size of the distributed cache or a policy to shard a node of the distributed cache; and one or more instructions to apply the received cache tuning policy to the distributed cache.

* * * * *